Feb. 24, 1959   E. S. MARVIN ET AL   2,874,624
DOUBLE EXPOSURE PREVENTION DEVICE
Filed Dec. 16, 1955   2 Sheets-Sheet 1

EDGAR S. MARVIN
ROBERT F. O'BRIEN
INVENTORS

BY Daniel J. Mayne
J. Griffin Little
ATTORNEYS

Feb. 24, 1959

E. S. MARVIN ET AL 2,874,624

DOUBLE EXPOSURE PREVENTION DEVICE

Filed Dec. 16, 1955

EDGAR S. MARVIN
ROBERT F. O'BRIEN
INVENTORS

BY
ATTORNEYS

United States Patent Office 2,874,624
Patented Feb. 24, 1959

2,874,624
DOUBLE EXPOSURE PREVENTION DEVICE

Edgar S. Marvin and Robert F. O'Brien, Rochester, N. Y., assignors to Eastman Kodak Company, Rochester, N. Y., a corporation of New Jersey Application December 16, 1955, Serial No. 553,632

12 Claims. (Cl. 95—31)

The present invention relates to a camera and more particularly to a shutter-operating mechanism for said camera.

As is well known, it is desirable to set or tension the shutter when the film is being wound so that both operations may be controlled from the film winding knob. This will assure that the shutter is set for operation as soon as a new or unexposed image area has been moved into exposing position. It is also desirable to set the shutter only during the initial rotation of the winding knob and then disconnect the knob from the shutter so that the knob rotation can be continued to complete the winding of the image area. Also, it is desirable to combine these features with a release locking lever which effectively prevents a second actuation of the shutter trigger until the knob is rotated to wind up the exposed image area, and set the shutter. This will prevent the user from moving the trigger thinking that an exposure has been made. It is also preferred to control the release of the double exposure prevention mechanism from the winding knob.

The invention has as its principal object the provision of a new and improved automatic shutter-setting mechanism.

Another object of the invention is the provision of such a mechanism coupled with a double exposure prevention device.

Still another object of the invention is the provision of a shutter-setting mechanism and a shutter release locking lever which are controlled, in part, from the film winding knob.

Yet another object of the invention is the provision of a novel and improved arrangement for connecting the winding knob releasably and momentarily to the shutter-setting mechanism.

A still further object of the invention is the provision of such devices which are simple and rugged in structure, easy and automatic in their operation and highly satisfactory in use.

To these and other ends, the invention resides in certain improvements and combinations of parts, all as will be hereinafter more fully described, the novel features being pointed out in the claims at the end of the specification.

In the drawings.

Similar references numbered throughout the various views indicate the same parts.

Figure 2:
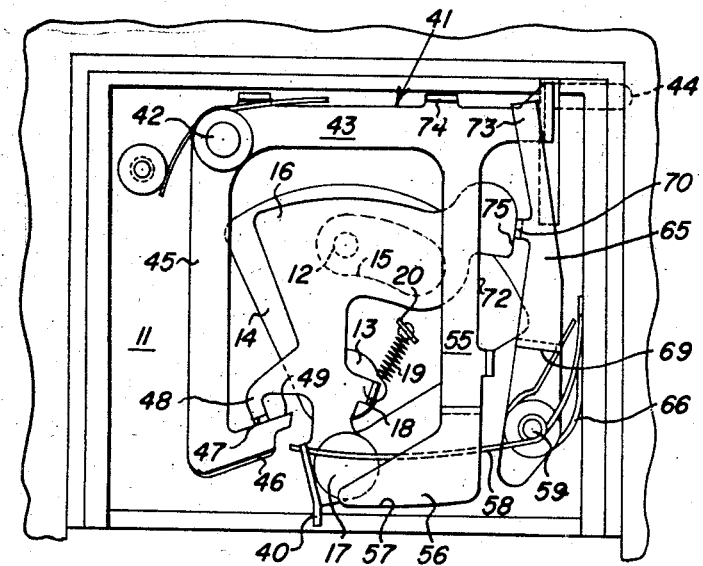
Fig. 2 is a view similar to Fig. 1, but showing the shutter in tensioned condition prior to the operation of the shutter trigger to make an exposure.

The shutter of the present invention comprises a shutter plate 11 having a suitable exposure aperture 12 formed therein. The plate 11 has rockably mounted thereon at 13 a shutter blade 14 having an elongated or kidney-shaped opening 15 which is adapted to be passed over the exposure aperture 12 to make an exposure. A shutter blind 16, of the shape best shown in Figs. 1 and 2, overlies blade 14 and the opening 15 thereof, and is rockably mounted at 17 on plate 11. The blind 16 is provided with a lug or ear 18, spaced from pivot 17, to which is connected one end of a coil spring 19, the other end of which is connected to an ear 20 on blade 14. Thus, blind 16 is connected to blade 14 by means of a coil spring 19. It will thus be apparent that as blind 16 is rocked counterclockwise as viewed in Fig. 2 about its pivot 17, the lug or ear 18 is moved in an arc about pivot 17 as a center. Such movement of lug 18 will similarly carry the end of spring 19, attached to lug 18, through said arc and will serve to tension the spring 19. This movement is continued and the tension of the spring is gradually increased until the lug 18 passes dead center. Thereupon, the tensioned spring 19 will quickly and automatically rock the blade to the position shown in Fig. 1. The rocking movement of the blade is continued in a manner and for a purpose to be later described.

A second plate or wall 25 is arranged normal to plate 11 and carries shaft 26 which extends through the wall 25 and has a film winding knob 27 secured to the outer end thereof. The inner end of shaft 26 is connectable in any suitable and well known manner to the film take-up roll, not shown, so that rotation of the knob in the proper direction serves to wind up the exposed film area. Also, as is usual practice, a non-reversing clutch, not shown, and of any suitable design, may be associated with shaft 26 or knob 27 to prevent reverse rotation thereof. As such a clutch is well known and forms no part of the present invention, it is not described or illustrated. The inner end of shaft 26 has secured thereto for rotation therewith a cam 28 of the shape best shown in Fig. 6.

Figure 6:
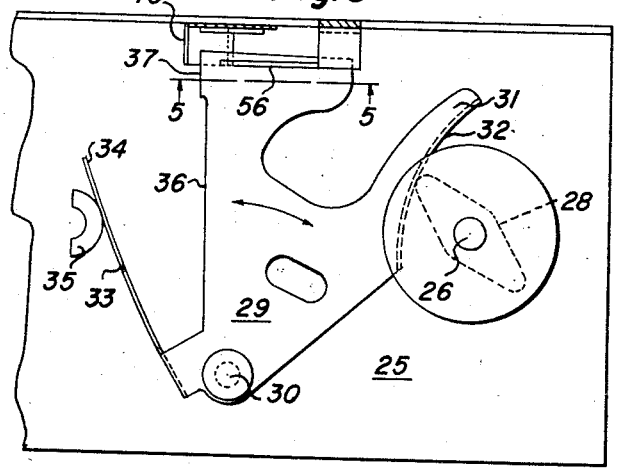
Fig. 6 is a side elevation view of the oscillating shuttle and the winding knob cam for operating the shuttle, and the relation of the shuttle to the cover blind.

The plate 25 carries an oscillating shuttle 29 formed of a thin flexible material, such as metal, and of the shape shown in Fig. 6 and rockably mounted at 30 on plate 25. The shuttle 29 is formed with a curved arcuate or suitably shaped portion 31 which is engaged by cam 28, as clearly illustrated in Fig. 6. The edge forming the curved portion 31 is preferably turned down as shown at 32, to form a wide edge which may be readily engaged by cam 28. A leaf spring 33 carried by shuttle 29 has a free end 34 engaging a fixed stud of lug 35 on plate 25 to urge the shuttle clockwise, as viewed in Fig. 6, to hold edge 32 in positive contact with cam 28, as is deemed apparent from an inspection of Fig. 6. The left edge 36 of shuttle 29, as viewed in Fig. 6, has the lower portion 37 turned over to form a thickened or widened section, the purpose of which will be later described. It will be apparent from Fig. 6 that spring 33 will hold edge 32 of the shuttle 29 in positive engagement with the cam 28 so that rotation of the latter by the knob 27 will serve to rock or oscillate the shuttle in both directions, as shown by the arrows in Fig. 6, about the pivot 30.

The lower end of blind 16, Figs. 1 and 2, below the pivot 17, has an edge turned up, as shown at 40. This turned-up edge 40 is, at times, positioned in the path of the portion 37 of shuttle 29, as shown in solid lines in Figs. 4 and 5. The particular relation of portion 37 to edge 40 depends on the amount of turning of the knob 27 to wind the film. The extreme leftward position of portion 37 will be approximately in the dotted position shown in Fig. 4 and at a position to the left of the solid line position shown in Fig. 4. If the portion 37 is positioned as shown in dotted lines in Fig. 4 the initial rotation of knob 37 will rock shuttle 29 clockwise about pivot 30 to move portion 37 to a position slightly to the right of edge 40. At this time, due to the flexible nature of the shuttle 29, the lower end of the latter and portion 37 will spring upwardly, as viewed in Figs. 4 and 5, to the plane of the solid line relation of the shuttle. Continued rotation of knob 27 will serve to rock shuttle 29 slightly further clockwise to move the portion 37 further to the right of the solid-line position in Fig. 4. However, a point is reached in the rotation of cam 28 where the rocking movement is reversed and the latter then starts to rock or pivot counterclockwise about pivot 30 to move the portion 37 to the left, Fig. 4, and towards the edge 40 of the blind 16. Continued counterclockwise rocking of shuttle 29 will finally bring portion 37 into positive engagement with edge 40 to impart a clockwise rocking movement, Figs. 1 and 2, to blind 16 to rock blade 14 through the spring 19 to tension or set the shutter. The parts are now in the position illustrated in Fig. 2.

Figure 7:
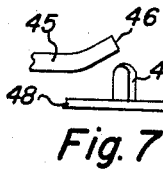
Figs. 7–9 show the various positions of the shutter blind locking parts during the shutter setting operation.
Figure 8:
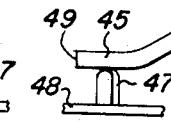
Figure 9:
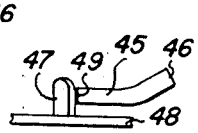

A shutter tripping lever 41 in the form of a bell crank is pivoted at 42 on plate 11. One arm 43 of the bell crank extends through a registering aperture in the plate 11 and terminates in a finger actuating portion 44. It is thus apparent from Figs. 1–3 that if portion 44 is pressed downwardly, the bell crank will rock clockwise about pivot 42. The other arm 45 of the bell crank has formed on the free end thereof a turned-up end 46 which overlies a bent up ear 47 formed on an arm 48 projecting laterally from the blind 16. The free end of the arm 45 is also formed with a locking edge 49 of the shape best shown in Figs. 1–3. Now, as the blind 16 is rocked clockwise by reason of the engagement of portion 37 of shuttle 29 with a turned-up edge 40 of blind 16, the ear 47 will slide under the bent up end 46 of arm 45 and will gradually lift the end 46, as clearly illustrated in Figs. 7–9, the ear 47 acting like a cam to lift the end as the ear 47 slides thereunder. This lifting and sliding action continues until the blind 16 and blade 14 have been moved to the position illustrated in Fig. 2. At this time, the ear 47 passes from in under end 46 and snaps behind the locking edge 49 of end 46 to lock the blind 16 and hence blade 14 in a set or tensioned condition as shown in Figs. 2 and 9. Thus, the rotation of knob 27 not only winds the film, but also rocks shuttle 29 which in turn rocks blind 16 and blade 14 to tension or set the shutter. After the shutter has been set, ear 47 engages behind edge 49 to hold the blind and blade in a set condition. By means of this arrangement, the winding of the film and the setting of the shutter are controlled from the winding knob 27.

Figure 4:
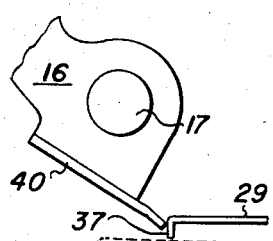
Fig. 4 is a view of a portion of the shutter mechanism, showing the relation of the shutter blind and the operating portion of the shuttle, when the parts are in the position illustrated in Fig. 1.
Figure 5:
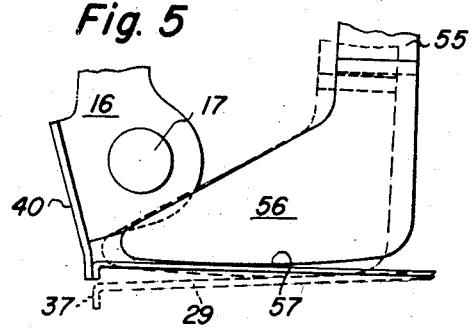
Fig. 5 is a partial view of Fig. 2, but showing the relation of the trigger engaging portion and the cover blind at the end of the shutter setting operation, and taken on line 5—5 of Fig. 6.

As the shuttle 29 is rocked clockwise about its pivot 30 by cam 28, as above described, the portion 37 is moved from the solid line position shown in Fig. 4 to the solid line position illustrated in Fig. 5. The solid line position shown in Fig. 5 is the extreme leftward movement of portion 37 and hence shuttle 29 and is the same as the dotted position shown in Fig. 4. Further rotation of knob 27 and cam 28 to wind the film now serves to rock the shuttle clockwise about its pivot and move the portion 37 to the right and away from edge 40. Thus, after the shutter has been set, the knob 27, cam 28, shuttle 29 and portion 37 are completely and automatically disconnected from the blind 16 and blade 14. The rotation of knob 27 can then be continued to wind up the exposed image area. During this additional rotation of knob 27, the shuttle 29 and portion 37 oscillate freely back and forth without imparting any further movement to edge 40, blind 16 and blade 14. The amount of such movement, and hence, the final position of the shuttle 29 and portion 37 will depend on the amount of rotation of the knob 27 necessary to wind up the image area. However, as is deemed apparent from the above description, the knob 27 is connected to the blind 16 and hence, blade 14 only during a portion of the initial rotation of the knob. Whereupon the knob is completely and automatically disconnected from the blind and blade. Therefore, the knob may be considered as being connected only momentarily to the shutter parts to set the shutter. Also, the shutter setting occurs only during the initial portion of the knob rotation.

Figure 3:
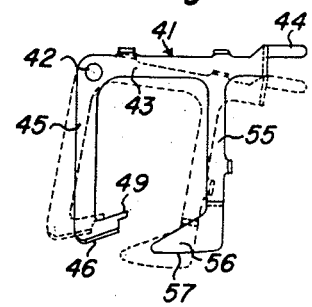
Fig. 3 is a partial view of Figs. 1 or 2, showing the position of the shutter trigger and the parts controlled thereby near the end of the movement of the shutter trigger to make an exposure.

When the shutter is set, the blind 16 and the blade 14 are in the position illustrated in Fig. 2. However, when the shutter is tripped the blind 16 and blade 14 rock counterclockwise, as viewed in Fig. 2, about their respective pivots 17 and 13. In this counterclockwise movement, opening 15 of blade 14 passes over aperture 12 in plate 11 to make an exposure.

It is apparent from the above description that although portion 37 of shuttle 29 is disconnected from edge 40 of blind 16, the portion 37 is still positioned in the path of edge 40. Therefore, in order to enable blind 16 and blade 14 to move counterclockwise to make the exposure, it is necessary to move the shuttle 29 or at least the lower portion thereof, and hence, portion 37 out of the path of edge 40 to a position such as shown in dotted lines in Figs. 4 and 5. Also, as the ear 47 is locked behind edge 49, it is necessary to disengage ear 47 from edge 49 before the blind and blade may be moved counterclockwise to make the exposure.

While these functions may be secured in a variety of ways, the present invention provides means controlled from the shutter-tripping lever 41 to control these functions in a definite timed relation with each other and the tripping of the shutter to make the exposure. To this end, the bell crank shutter-tripping lever 41 is formed with a laterally projected arm 55, the lower end of which terminates in a shoe 56 of the shape best shown in Figs. 1, 2, 3 and 5. The free or lower edge 57 of the shoe 56 is positioned closely adjacent the lower portion of shuttle 29, as best shown in solid lines in Fig. 5. It will be remembered that the bell crank lever 41 is pivoted at 42 at a point to the left of and above arm 55, as shown in Figs. 1 and 2. Now when the finger portion 44 is depressed or pressed downwardly to make an exposure, the bell crank lever 41 will rock clockwise about pivot 42 and carry arm 55 therewith. As shoe 56 is spaced from pivot 42 such rocking of lever 41 will cause shoe 56 and edge 57 to move about an arc with pivot 42 as its center. Such arcuate movement of shoe 56 will cause edge 57 thereof to engage shuttle 29 and flex the latter downwardly to the dotted position shown in Figs. 4 and 5 to move portion 37 of the shuttle out of the path of edge 40 of blind 16. Such movement of the shuttle frees edge 40 of blind 16, as is deemed apparent.

Figure 1:
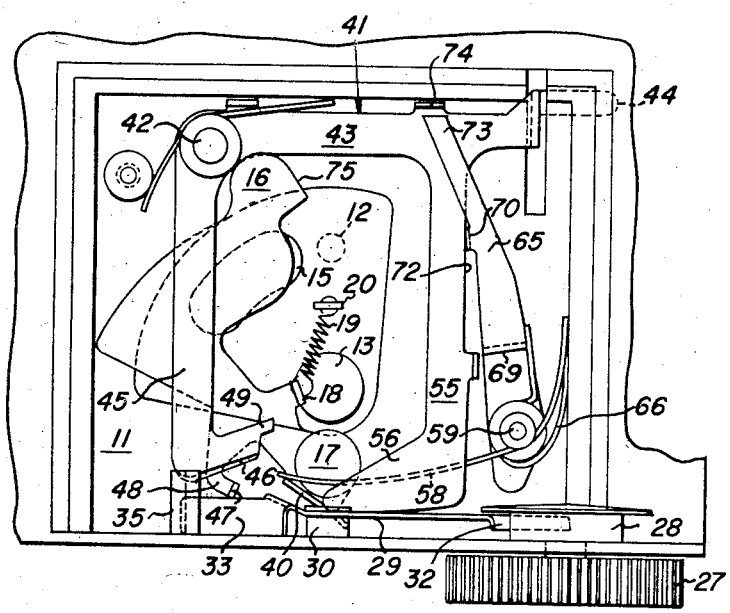
Fig. 1 is a rear view of the shutter of the present invention, showing the shutter parts in their released position.

Also, this clockwise rocking of the bell crank tripping lever 41 about its pivot 42 will cause arm 45 of the bell crank to move clockwise about pivot 42, as is deemed apparent from Figs. 1 and 2. Such movement will cause the bent-up end 46 and the locking edge 49 to move to the left, as viewed in Figs. 1 and 2, and out of holding relation with ear 47 to free blind 16 and blade 14. The freed blind and blade will both rock counterclockwise about their respective pivots to the initial position shown in Fig. 1.

To secure this return movement, a coil spring 58 is wrapped around a stud 59 on plate 11 and has an end 60 engaging an edge or shoulder of plate 11 and another end resting on portion 40 of blind 16.

In addition to setting and tripping the shutter, the present invention provides a mechanism by which a second actuation of the shutter trigger is prevented until after the exposed film has been wound. This will prevent a person from inadvertently moving the lever 41 with the intent of making an exposure. As will be remembered, after the lever 41 has been actuated to make an exposure, the shutter parts are returned to the position shown in Fig. 1, and the shutter is now released or not tensioned. Therefore, the depressing of lever 41 after an exposure has been made but before the film is wound will not make an exposure, but the user may think such an exposure was made, and thus loses a desirable picture. In order to overcome this difficulty, the present invention provides a release locking lever which will lock effectively lever 41 against a second actuation until the film has been wound and the shutter set.

To secure this result, a locking lever 65 is pivoted on stud 5 carried by plate 11. This lever is rocked in a counterclockwise direction about stud 59 by means of a coil spring 66, which is wrapped around the stud 59 and has one end engaging an edge of plate 11, and the other end extending through a lug or ear 69 formed on lever 65, as shown in Figs. 1 and 2. This counterclockwise movement of lever 65 is limited by means of a lug 70 on the left edge of lever 65 engaging right edge 72 of arm 55. Such engagement serves to position the free end 73 of lever 65 in the path of an upturned ear 74 formed on arm 43 of the bell crank tripping lever 41, as clearly illustrated in Fig. 1. Thus, the lever 41 is held against a clockwise movement and cannot, therefore, be actuated to make a second or accidental exposure. After an exposure has been made, the next operation is to wind up the exposed image area by rotating the knob 27 in the manner above described. Such rotation of the knob will serve to rock the blade 14 and blind 16 clockwise above their pivots 13 and 17, respectively, to set the shutter in a manner fully described above. In this setting operation an edge 75 of the blind 16 is moved into engagement with the lug 70 on lever 65 to rock the latter clockwise, as viewed in Figs. 1 and 2, about stud 59. Such movement serves to swing the free end 73 of lever 65 to the right, as viewed in Figs. 1 and 2, and out of blocking relation with ear 74 to free the latter. Thus, the shutter tripping lever is locked against a second actuation after an exposure is made, and is again freed when the exposed film area has been wound up, and the shutter tensioned. This device will thus prevent a second actuation of the lever 41 before the film is wound and will prevent the user from moving lever 41 with the expectation that an exposure has been made.

Another feature which should be pointed out is the slanting arrangement of the locking edge 49. In rotating the knob 27 to wind the film, the amount of such rotation will depend upon the amount of film already wound. The greater the amount of film wound up the less rotation necessary to wind up the image area. The result is that cam 28 may be stopped with its high point in contact with edge 32 of shuttle 29, as shown in Fig. 6. With the parts in this position, the portion 37 has been given its maximum leftward throw and will be in the solid line position, Fig. 5, or the dotted line position, Fig. 4. In this relation the blind 16 has been given its maximum clockwise throw and the ear 47 will not be in actual contact with the edge 49, but, on the contrary, will be slightly spaced therefrom. In this position the tripping of the shutter lever 41 will move the shoe 56 into engagement with the shuttle 29 to move the portion 37 out of contact with edge 40. The blind 16 will then rock slightly counterclockwise to bring ear 47 into engagement with edge 49. This engagement may be accompanied by a slight clicking sound. Then, further rocking of lever 41 will move the edge 49 out of holding relation with ear 47 and the shutter will be tripped with an audible click. Now, by making the edge 49 inclined, as shown, by the rocking of lever 41 to bring shoe 56 into contact with shuttle 29 to disengage portion 37 from edge 40, will also move the inclined edge 49 upward toward ear 47 to pick up the latter slightly in advance of the release of portion 37 from edge 40, thus eliminating this initial clicking sound.

The present invention thus provides a mechanism by which the shutter setting mechanism is controlled from the filmwinding knob. To secure such setting, the shutter parts are connected momentarily to the winding knob during the initial portion of the rotation. Thereupon, the shutter mechanism is completely and automatically disconnected from the knob. This shutter setting mechanism is combined with a release locking lever which effectively prevents a second actuation of the shutter trigger after an exposure has been made. However, when the winding knob is rotated to wind up the exposed image area, the double exposure prevention mechanism is moved automatically to an inoperative position to free the shutter trigger. The parts of the present invention are simple, rugged, easy to operate, and highly effective in use.

While one embodiment of the invention has been disclosed it should be understood that the inventive idea may be carried out in a number of ways. Therefore, this application is not to be limited to the precise details described, but is intended to cover all variations and modifications thereof falling within the scope of the appended claims.

We claim:

1. In a camera, the combination with a film winding knob, of a shutter comprising a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, a shutter actuating trigger, cooperating means on said trigger and blind to hold said blade in tensioned relation, and means actuated by said trigger to move said holding means out of holding relation to permit the tensioned blade to move in the opposite direction to make an exposure.

2. In a camera, the combination with a film winding knob, of a shutter comprising a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, a shutter actuating trigger, cooperating means on said trigger and blind to hold said blade in tensioned relation, means actuated by said trigger to move said holding means out of holdiing relation to free said blade and blind, and means to rock said blade and blind in the opposite direction to make an exposure.

3. In a camera, the combination with a film winding knob, of a shutter comprising a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, a shutter tripping lever, means on said lever directly engaging said blind to hold said blade in tensioned relation, and means to disengage said connecting means from said blind and for moving said holding means out of holding relation with the tensioned blade in a definite timed relation.

4. In a camera, the combination with a film winding knob, of a shutter comprising a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, a shutter actuating trigger, means on said trigger engaging said blind directly to hold said blind in tensioned relation, means controlled by said trigger to disconnect said connecting means from said blind, means controlled by said trigger for moving the holding means out of holding relation in timed relation to the disconnecting of said connecting means, said moving of said holding means out of holding relation serving to free said blind and blade, and means to rock said blind and blade in the opposite direction to make an exposure.

5. In a camera, the combination with a film winding knob, of a shutter comprising a shutter plate, a shutter blade and a shutter blind arranged in overlying relation and rockably mounted on said plate, means yieldably connecting said blind to said blade so that rocking of said blind in one direction similarly moves said blade to tension the latter, an oscillatable shuttle mounted on said plate, a cam carried by said knob and engaging said shuttle to oscillate the latter, said oscillation moving said shuttle into engagement with said blind to rock the latter and said blade in one direction to tension said blade, a shutter release member rockable on said plate, cooperating means on said member and said blind to hold said blade in tensioned relation, means on said member and operative when the latter is rocked to disconnect said shuttle from said blind, means on said member and operative when the latter is rocked and after the shutter is disconnected to move said blade holding means out of holding relation to free said blade and blind, and means for rocking the freed blade and blind in the opposite direction to make an exposure.

6. In a camera, the combination with a film winding knob, of a shutter comprising a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, means to hold said blade in tensioned relation, means to move said holding means out of holding relation to release said tensioned blade to permit the latter to move in the opposite direction to make an exposure, blocking means cooperating with said last mentioned means to prevent a second movement of said moving means prior to the rotation of the knob to move the blocking means out of blocking relation.

7. In a camera, the combination with a film winding knob, of a shutter comprising, a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation for the latter to wind film moves said blind and blade in said one direction, means to hold said blade in tensioned relation, a shutter actuating trigger, a blocking element positionable in the path of said trigger to prevent actuating thereof prior to the rotation of said knob, and means controlled by the rotation of said knob for moving said element out of blocking relation with said trigger.

8. In a camera, the combination with a film winding knob, of a shutter comprising, a shutter plate, a shutter blade and a shutter blind arranged in overlying relation and rockably mounted on said plate, means yieldably connecting said blind to said blade so that rocking said blind in one direction similarly moves said blade to tension the latter, means for connecting said blind releasably to said knob so that actuation of the latter to wind film moves said blind and blade in said one direction, means to hold said blade in tensioned relation, a shutter actuating trigger, a blocking element positionable in the path of said trigger to prevent actuating thereof prior to the rotation of said knob, and means on the blind for moving said element out of blocking relation with said trigger when said blind is moved in said one direction.

9. In a camera, the combination with a film winding knob, of a shutter comprising, a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, means to hold said blade in tensioned relation, a shutter actuating trigger, means operated by said trigger to move said holding means out of holding relation with said tensioned blade to permit the latter to move in the opposite direction to make an exposure, a blocking element positionable in the path of said trigger to prevent a second actuation of the trigger prior to rotation of said knob, means on said blind for moving said element out of blocking relation with said trigger when said blind and blade are moved in said one direction, and means to return said blocking element to blocking relation after said trigger has been actuated.

10. In a camera, the combination with a film winding knob, of a shutter comprising, a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, means to hold said blade in tensioned relation, a shutter actuating trigger, means operated by said trigger to move said holding means out of holding relation with said tensioned blade to permit the latter to move in the opposite direction to make an exposure, a blocking element positionable in the path of said trigger to prevent a second actuation of the trigger prior to rotation of said knob, means on said blind for moving said element out of blocking relation with said trigger when said blind and blade are moved in said one direction, said blind being movable out of engagement with said element when said blind and blade are moved in said opposite direction to make an exposure to free said element, and means to move the freed element into blocking relation with said trigger.

11. In a camera, the combination with a film winding knob, of a shutter comprising, a shutter plate, a shutter blade and a shutter blind arranged in overlying relation and rockably mounted on said plate, means yieldably connecting said blind to said blade so that rocking of said blind in one direction similarly moves said blade to tension the latter, means for connecting said blind releasably to said knob so that actuation of the latter to wind film moves said blind and blade in said one direction, means to hold said blade in tensioned relation, a shutter actuating trigger, means on said trigger for disconnecting said connecting means from said blind, means on said trigger for then moving said holding means out of holding relation to free said blind and blade, means for moving said blind and blade in the opposite direction to make an exposure, a blocking element positionable in the path of said trigger to prevent movement thereof, means on said blind for engaging and moving said element out of blocking relation to free said trigger for movement to make an exposure, said blind moving out of engagement with said element when said blade and blind are moved in said opposite direction, and spring means connected to said element to return the latter into blocking relation with said trigger.

12. In a camera, the combination with a film winding knob, of a shutter comprising, a shutter plate, a shutter blade and a shutter blind arranged in overlying relation and rockably mounted on said plate, means yieldably connecting said blind to said blade so that rocking of said blind in one direction similarly moves said blade to tension the latter, an oscillatable shuttle mounted on said plate, a cam carried by said knob and engaging said shuttle to oscillate the latter, said oscillation moving said shuttle into engagement with said blind to rock the latter and said blade in one direction to tension said blade, a shutter release member rockable on said plate, cooperating means on said member and said blind to hold said blade in tensioned relation, means on said member and operative when the latter is rocked to disconnect said shuttle from said blind, means on said member and operative when the latter is rocked and after the shutter is disconnected to move said blade holding means out of holding relation to free said blade and blind, means for rocking the freed blade and blind in the opposite direction to make an exposure, a blocking element positionable to block said trigger against actuation, means on said blind for engaging and moving said element out of blocking position when said blind is moved in said one direction, the movement of said blind in said other direction moving said element engaging means out of engagement with said element when said blind is moved in said opposite direction to free said blind, and means to return the freed element into blocking relation with said trigger.

References Cited in the file of this patent

UNITED STATES PATENTS

| | | |
|---|---|---|
| 2,664,799 | Wilkinson | Jan. 5, 1954 |
| 2,742,835 | Owens | Apr. 24, 1956 |

FOREIGN PATENTS

| | | |
|---|---|---|
| 724,079 | Great Britain | Feb. 16, 1955 |
| 1,062,074 | France | Dec. 2, 1953 |